Oct. 9, 1923.                                                          1,470,509
                              L. G. STRANSKY
                    COMBINED PRESSURE CAP AND GAUGE DEVICE
                          Filed Aug. 5, 1922          2 Sheets-Sheet 1
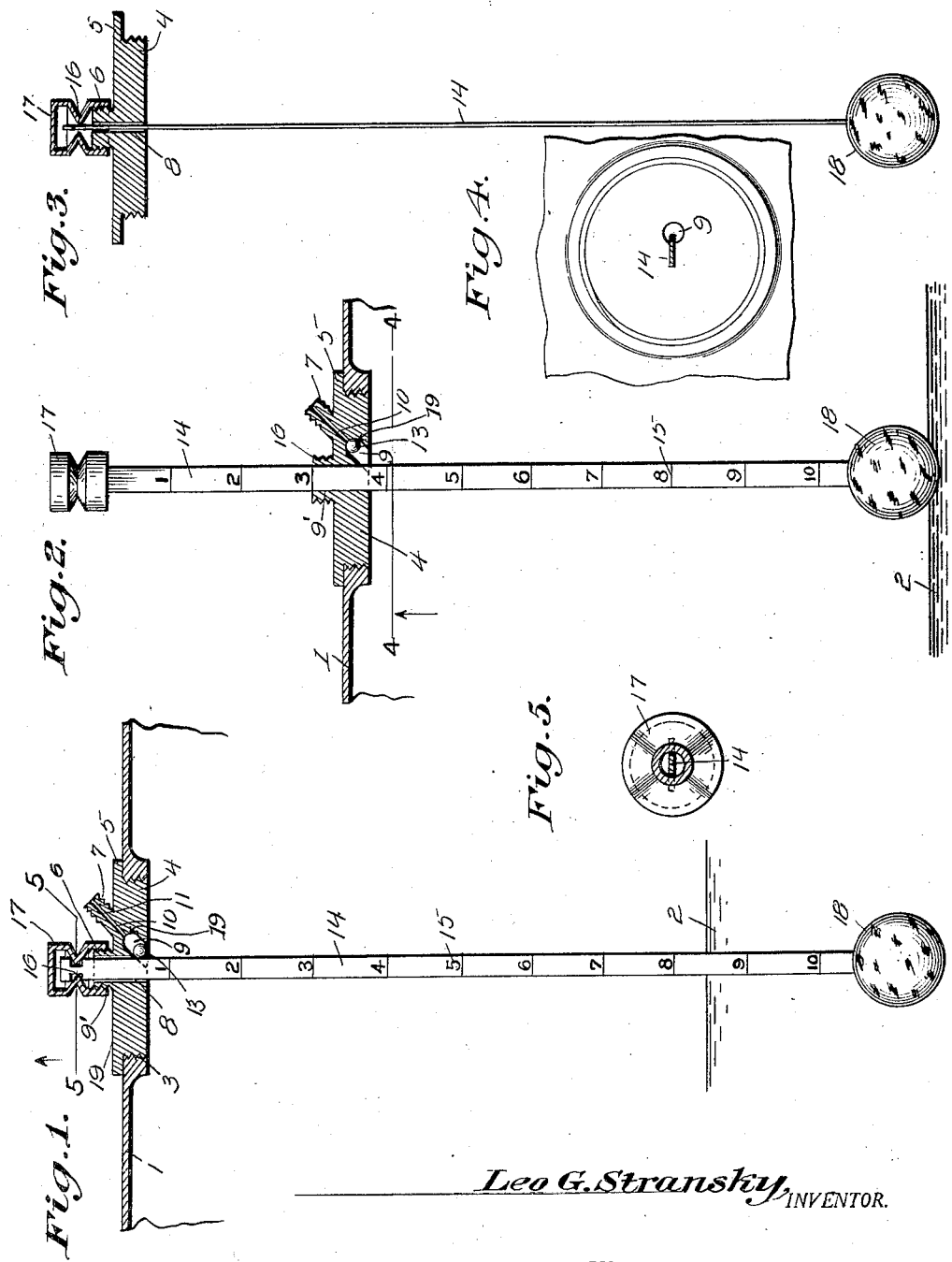
Leo G. Stransky, INVENTOR.
BY Geo. F. Kimmel, ATTORNEY.

Oct. 9, 1923.
L. G. STRANSKY
1,470,509
COMBINED PRESSURE CAP AND GAUGE DEVICE
Filed Aug. 5, 1922    2 Sheets-Sheet 2
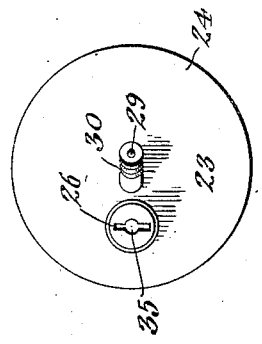
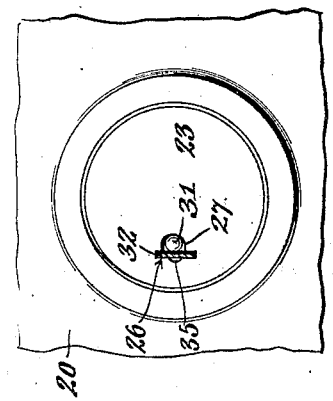
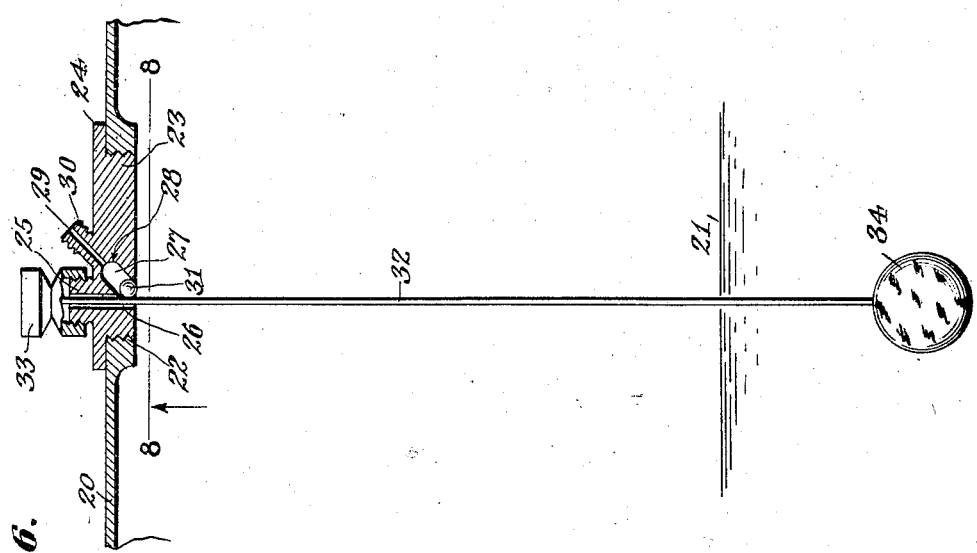
*Leo G. Stransky,* INVENTOR.
BY *Geo. P. Kimmel,* ATTORNEY.

Patented Oct. 9, 1923.

1,470,509

UNITED STATES PATENT OFFICE.

LEO G. STRANSKY, OF PUKWANA, SOUTH DAKOTA.

COMBINED PRESSURE CAP AND GAUGE DEVICE.

Application filed August 5, 1922. Serial No. 579,910.

*To all whom it may concern:*

Be it known that I, LEO G. STRANSKY, a citizen of the United States, residing at Pukwana, in the county of Brule and State of South Dakota, have invented certain new and useful Improvements in Combined Pressure Caps and Gauge Devices, of which the following is a specification.

This invention relates to a combined pressure cap and gauge device for gasoline tanks and is designed primarily for use in connection with Ford and Chevrolet cars, but it is to be understood that the device can be employed for any purposes or in connection with any car wherein it is found applicable, and the invention has for its object to provide a device of such class, in a manner as hereinafter set forth, with means to permit of the supplying of pressure to a gasoline tank, as well as confining the pressure in the tank, for the purpose of causing the feed of the gasoline, within the tank to a carbureter, after the feed has been retarded or discontinued, and further providing the device with means for ascertaining or gauging the quantity of the gasoline within the tank.

A further object of the invention is to provide a device of such class, with means in a manner as hereinafter set forth, which permits of the cleaning of the gasoline feed pipe or tube, if the latter becomes clogged up, or contains any foreign substances, which would interfere with the feeding of the gas to the carbureter.

It is well known that many motor vehicles are not provided with a vacuum feed system for gasoline, and under such conditions the gasoline is supplied to the carbureter by gravity feed, and it is well known that often times on steep hills when the gasoline is low or when the rear of the car is ditched, the gasoline will not flow to the carbureter, in fact the flow is interfered with at any time when the level of the gasoline is lower than the carbureter, under such conditions it is impossible to keep the motor running unless the level of the gasoline is raised to such a point that will cause a proper feed, and to overcome the foregoing objections so as to obtain a proper feed of the gasoline is the aim of this invention, and which is accomplished by the attaching to the gasoline tank a valved pressure cap and gasoline gauge where by the attaching of the tire pump to the cap sufficient air, under pressure can be supplied to the tank, to force the gasoline to the carbureter. When the pressure is supplied, the back pressure within the tank will seat the valve in the cap, thus closing the only outlet, and the valve will remain seated or closed until the pressure is relieved thereon, and by such an arrangement the only way of relieving the pressure, is by the gasoline being forced to the carbureter, under such conditions it is evident that a feed of the gasoline to the carbureter to keep the motor running is attained.

Further objects of the invention are to provide a combined pressure cap and gauge for gasoline tanks which is simple in its construction and arrangement, strong, durable, efficient and convenient in its use, readily set up with respect to the tank, and inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which come within the scope of the claims hereunto appended.

In the drawings wherein like reference characters denote corresponding parts throughout the several views:—

Figure 1 is a sectional elevation, broken away, of a gasoline tank showing the adaptation therewith of a combined pressure cap and gauge therefor, the device being in an inactive position, Figure 2 is a like view with the device in an active position, Figure 3 is a section, at right angles to Figure 1, with the device in an inactive position, Figure 4, is a section on line 4—4, Figure 2.

Figure 5 is a section on line 5—5, Figure 1,

Figure 6 is a sectional elevation, broken away, of a gasoline tank showing the adaptation therewith of a modified construction of combined pressure cap and gauge therefor, the device being in an inactive position, Figure 7 is a top plan view of the cap forming an element of the device of the modified form and, Figure 8 is a section on line 8—8, Figure 6.

Referring to the drawings in detail, 1 denotes a gasoline tank, the latter being broken away and 2 the gasoline within the tank, the latter is provided with a filling opening 3 having the wall thereof threaded.

The combined pressure cap and gauge in accordance with this invention include a cap body 4 in the form of a thick circular disk, having peripheral threads whereby the cap body 4 can be secured within the filling opening by the engagement of the threads of the cap body with the threads of the wall of opening 3. The cap body 4 is provided with a laterally projecting annular flange 5 which overlaps the outer face of the top of the tank 1, when the cap is secured in position as shown in Figures 1 and 2. The upper face of the cap body 4 centrally thereof is formed with a vertically disposed peripherally threaded annular collar 6, and is futhermore provided with an inclined extension 7, which projects away from the collar 6. The cap body 4, centrally thereof, has a vertically disposed rectangular opening 8 which merges into a rectangular opening 9' formed in the collar 6. Disposed at an angle with respect to the opening 8, as well as communicating therewith, is a valve chamber 9, formed in the cap body 4, and which communicates with an upwardly extending and outwardly inclined port 10, which merges into an inclined duct 11, extending through the extension 7. Arranged within the valve chamber 9, is a globular valve 13.

Extending down through the openings 8 and 9' is an indicator rod 14, which is rectangular in cross section, and one edge thereof acts as a means to retain the valve 13 within the chamber 9, see Figure 1. The rod 14 is provided with a liquid level indicating scale 15, which may be applied to either side of the rod 14, and the latter has a T-shaped upper end 16, for swivelly connecting thereto, a combined locking and closing element 17, in the form of a cylindrical cap inset to engage over the head of the T-shaped upper end 16, and furthermore provided with interior threads for engaging with the peripheral threads of the collar 6, whereby when said element 17 is in engagement with the threads of collar 6 the rod 14 will be locked from movement and the collar, as well as the openings 8 and 9' closed. The lower end of the rod 14 has secured thereto, in any suitable manner, a float 18 which when the rod 14 is released, will automatically elevate the rod to indicate the level of the gasoline within the tank.

When using the device for supplying pressure to the gasoline tank for the purpose of causing the feed of gasoline to the carbureter, the parts will be in the position as shown in Figure 1. The tire pump is attached to the extension 7 and the required body of air under pressure, is supplied to the tank to force the gasoline to the carbureter. The back pressure in the tank will cause the valve 13 to raise to its seat 19 whereby the port 10 will be closed and under such conditions closing the outlet from the tank, and the valve will remain seated until the pressure within the tank has become exhausted or relieved, and the relieving of the pressure is by the gasoline being forced to the carbureter. Under the foregoing arrangement and operation, it is obvious that the gasoline will be fed to the carbureter.

If it be desired to ascertain the level or amount of liquid in the tank, the element 17 is disconnected from the collar 6 releasing the rod 14, whereby the float 18 will elevate the rod 14 so that the amount of gasoline within the tank can be ascertained.

The valve 13 must be retained within the valve chamber 9 perfectly loose and free to move whenever pressure is supplied to the tank, and by the arrangement shown, the necessary play for the valve is always had, as the rod 14, only partially closes the inner end of the valve chamber 9, in fact the engagement between the rod 14 and valve 13 is just sufficient to prevent the valve from falling out of the chamber 9, but at the same time not interfering in any manner with the operation of the valve to close the port 10 when pressure is supplied to the tank.

The element 17, as well as the valve 13 when the tank is filled with gasoline, prevents any waste of the latter by splashing.

In the modified form shown in Figures 6, 7 and 9, 20 denotes the gasoline tank, 21 the gasoline therein, and 22 the filling opening for the tank 20; the wall of the filling open is threaded.

The cap body, which corresponds to the cap body 4 as indicated at 23, is formed with a lateral flange and has threaded engagement wth the threaded wall of the opening 22.

On upper face of the cap body 23, at a point between the center and the edge thereof are eccentrically disposed with respect to the axis of the cap, a peripherally threaded annular collar 25 is arranged, and is formed integral with the cap body 23. Extending through the collar 25, as well as the cap body 23, is a rectangular opening 26, which is disposed at an angle with respect to the plane in which the opening 8 extends, that is to say the position of the opening 26 is at right-angles with respect to the plane of the opening 8 in the cap body 4. Formed in the cap body 23, extending upwardly and outwardly at an inclination, and further disposed at an angle with respect to the opening 26, is a valve chamber 27, which has its lower end intersected by the opening 26. The valve chamber 27 at its upper end is formed with a seat 28, and communicating with the upper end of the chamber 27, is an inclined duct 29 which is of a length to extend through an inclined extension 30, formed integral with the top of the cap body 23 and which is peripherally threaded. Arranged within the valve chamber 27, is a freely movable globular valve 31, the normal position of which is at the lower end of the chamber 27.

Extending down through the opening 26, is an indicating rod 32, which has one side thereof acting as a means to retain the valve 31 within the chamber 27. The rod 32, is constructed in the same manner as the rod 14, illustrated in Figure 1, but the rod 32 is disposed in a plane at right-angles with respect to the rod 14, so that one side of the rod 32 will act to retain the valve 31 in the chamber 27, but will not interfere with the free movement of the valve. In the construction shown in Figure 1, one edge of the rod 14 is employed to retain the globular valve within its chamber, but in the modified form, one side of the indicator rod is employed for such purpose. Carried by the upper end of the rod 32, is a combined locking and closing element 33, and which is swivelly connected to the upper end of the rod 32, in the same manner as the element 17, is connected to the rod 14, as illustrated in Figure 1. The element 33 is formed with internal threads which are adapted to engage with the peripheral threads of the collar 25 where by the element 33 will be secured to the collar 25 and the rod 32 locked from vertical movement. The lower end of the rod 32 has secured thereto, in any suitable manner, the float 34, which when the rod 32 is released by the disengagement of the element 33, with the collar 25, will automatically elevate the rod to indicate the level of the gasoline within the tank to provide for the free movement of the rod and to lessen the resistance of the rod, which will be held in place by the walls of the slot or opening 26, the side walls of said opening 26 are notched or formed with recesses 35.

The positioning of the collar 25 and extension 30 eccentrically with respect to the axis of the cap body 23, makes it possible to fill the tank without removing the rod and float therefrom.

What I claim is:—

1. In a device for the purpose set forth, a closure cap element for a gasoline tank provided with means to permit of the supplying of pressure to and confining it in the gasoline tank, said means including a valvular element, and a gauge extending through the cap element for retaining said valvular element therein.

2. In a device for the purpose set forth, a closure cap element for a gasoline tank provided with means to permit of the supplying of pressure to and confining it in the gasoline tank, said means including a valvular element, and a gauge extending through the cap element for retaining said valvular element therein, and means for closing said cap element and further to prevent the operation of the gauge element.

3. In a device for the purpose set forth, a valved cap element for closing a gasoline tank and a gauge element extending through the cap and arranged in cooperative relation with the valve of the cap element.

4. A device for the purpose set forth comprising a valved cap element for closing a gasoline tank, said element provided with valved means to establish communication between a source of pressure supply and the interior of a gasoline tank and further provided with a centrally disposed opening, a gauge element extending through said opening and cooperative with said valved element, a closure means for said valved element and a closure means for said opening.

5. A device for the purpose set forth comprising a cap element adapted to close the filling opening of a gasoline tank, said element provided with a valved chamber and further with means leading from the valved chamber to the atmosphere, a valve mounted in said chamber, a retainer member extending through said element for retaining the valve in said chamber, a closure element for said means and a locking element for said member.

6. A device for the purpose set forth comprising a gasoline tank closure cap provided with means to permit of the supplying of pressure to the tank and including a valvular element, and a gauge element extending through the cap and providing means for retaining the valve within the cap.

7. A device for the purpose set forth comprising a gasoline tank closure cap provided with means to permit of the supplying of pressure to the tank and including a valvular element, and a gauge element extending through the cap and providing means for retaining the valve within the cap, a closure element for said means and a combined closure and locking element for said gauge element.

In testimony whereof, I affix my signature hereto.

LEO G. STRANSKY.